United States Patent
Peng et al.

(10) Patent No.: US 12,103,872 B1
(45) Date of Patent: Oct. 1, 2024

(54) POLYCYCLIC AZIDE DESULFURIZER AND SYNTHESIS METHOD THEREOF

(71) Applicant: Southwest Petroleum University, Chengdu (CN)

(72) Inventors: Xingyu Peng, Chengdu (CN); Jianhua Gong, Chengdu (CN); Feng Ge, Chengdu (CN); Yang Ren, Chengdu (CN); Huaiyu Sun, Chengdu (CN); Lisheng Liu, Chengdu (CN); Zhihua Yuan, Chengdu (CN); Ke Yan, Chengdu (CN); Feng Ye, Chengdu (CN); Hong Li, Chengdu (CN)

(73) Assignee: Southwest Petroleum University (CN)

( * ) Notice: Subject to any disclaimer, the term of this patent is extended or adjusted under 35 U.S.C. 154(b) by 0 days.

(21) Appl. No.: 18/545,470

(22) Filed: Dec. 19, 2023

(30) Foreign Application Priority Data

Jul. 10, 2023 (CN) .......................... 202310839580.2

(51) Int. Cl.
*C02F 1/68* (2023.01)
*C02F 101/10* (2006.01)

(52) U.S. Cl.
CPC .......... *C02F 1/68* (2013.01); *C02F 2101/101* (2013.01)

(58) Field of Classification Search
None
See application file for complete search history.

(56) References Cited

U.S. PATENT DOCUMENTS

2013/0004393 A1* 1/2013 Menendez ............. B01D 53/52 210/749

FOREIGN PATENT DOCUMENTS

RU 2162728 C2 * 2/2001

OTHER PUBLICATIONS

Machine translation of RU 2162728 (Year: 2001).*

* cited by examiner

*Primary Examiner* — Peter Keyworth
(74) *Attorney, Agent, or Firm* — Dickinson Wright PLLC

(57) ABSTRACT

Disclosed is a polycyclic azide desulfurizer, including the following raw materials in parts by mass: 20-35 parts of an alcohol amine, 20-35 parts of an amide, and an aldehyde, which is 10-15 parts of a small-molecule aldehyde or 20-35 parts of a polyaldehyde. Also disclosed is a method for synthesis of the polycyclic azide desulfurizer, including: mixing an alcohol amine with an amide and stirring, heating, adding a catalyst I dropwise, and performing reaction to obtain a monocyclic triazine, heating the monocyclic triazine, mixing with a polyaldehyde and stirring, adding a catalyst II dropwise, and performing coupling while stirring; alternatively, mixing a small-molecule aldehyde with an amide and stirring, heating, adding a catalyst I dropwise, and performing reaction, adding an alcohol amine, adding a catalyst II dropwise, and performing coupling while stirring; and separating a by-product from a product obtained after the coupling out, and purifying the product.

6 Claims, 2 Drawing Sheets

POLYCYCLIC AZIDE DESULFURIZER AND SYNTHESIS METHOD THEREOF

CROSS REFERENCE TO RELATED APPLICATION

This patent application claims the benefit and priority of Chinese Patent Application No. 2023108395802 filed with the China National Intellectual Property Administration on Jul. 10, 2023, the disclosure of which is incorporated by reference herein in its entirety as part of the present application.

TECHNICAL FIELD

The present disclosure relates to the technical field of desulfurizers, in particular to a polycyclic azide desulfurizer and a synthesis method thereof.

BACKGROUND

Transportation of sulfur-containing sewage in natural gas mines is characterized by large volume, long distance, and high risks. Gas field sewage is generally purified and re-injected through filters, pressure pumps, water injection pumps and other equipment. In these processes, pipelines and equipment are always corroded, thus seriously affecting normal production and causing huge economic losses. In some areas, centralized transportation is adopted to solve the above problems. During the transportation, once sewage leaks, dissolved hydrogen sulfide and other substances in the sewage may lead to vicious environmental accidents such as contamination of drinking water intake points and even poisoning of surrounding personnel. Hydrogen sulfide is a highly irritating gas with a strong rotten egg smell. During the production of oil and gas wells, the hydrogen sulfide could not only cause equipment and pipeline corrosion and catalyst poisoning, but also seriously threaten personal safety.

Triazine desulfurizers have desirable sulfur removal efficiency, are easy to prepare industrially, and generate water-soluble and low-toxic products. This type of desulfurizer has bactericidal properties, could reduce equipment corrosion, and is environmentally friendly, and show low equipment requirements. Moreover, the triazine desulfurizers exhibit easy operations and a low cost in industrial application. However, triazine desulfurizers are rarely used in China, with only a few indoor studies and field tests, while foreign research on same has been developing towards breakthroughs in monomer sulfur removal rates. In order to achieve independent core technology and efficient desulfurization, and to meet increasingly stringent environmental regulations in China, it is necessary to develop a desulfurizer that efficiently absorbs hydrogen sulfide.

SUMMARY

In order to solve the problems existing in the prior art, the present disclosure provides a polycyclic azide desulfurizer and a synthesis method thereof. An object of the present disclosure is to provide a synthetic high-efficiency polycyclic azide desulfurizer, which is suitable for the treatment of sulfur-containing sewage in oil and gas fields. A polytriazine ring of the desulfurizer could achieve high monomer sulfur removal rate and effectively reduce sulfur content in the sewage; further, generated products of the desulfurizer are soluble in water and do not affect normal production.

The present disclosure adopts the following technical solutions.

The present disclosure provides a polycyclic azide desulfurizer, including the following raw materials in parts by mass: 20 parts to 35 parts of an alcohol amine, 20 parts to 35 parts of an amide, and an aldehyde, where the aldehyde is 10 parts to 15 parts of a small-molecule aldehyde or 20 parts to 35 parts of a polyaldehyde.

In some embodiments, the alcohol amine is one or a mixture of more than two selected from the group consisting of ethanolamine, ethylene glycol amine, diisopropanolamine, methyldiethanolamine, and triethanolamine.

In some embodiments, the small-molecule aldehyde is one or a mixture of two selected from the group consisting of formaldehyde, acetaldehyde, and propionaldehyde.

In some embodiments, the polyaldehyde is one or more selected from the group consisting of glyoxal, glutaraldehyde, and adipaldehyde.

The present disclosure further provides a method for synthesis of a polycyclic azide desulfurizer, including the following steps:

1) mixing an alcohol amine with an amide and stirring evenly to obtain a mixture I, heating the mixture I, adding a catalyst I dropwise the mixture I, and performing reaction to obtain a monocyclic triazine, then heating the monocyclic triazine, mixing with a polyaldehyde and stirring evenly to obtain a mixture II, adding a catalyst II dropwise to the mixture II, and performing coupling reaction while stirring; alternatively, mixing a small-molecule aldehyde with an amide and stirring evenly to obtain a mixture III, heating the mixture III, adding a catalyst I dropwise to the mixture III, and performing reaction to obtain a reaction system, adding an alcohol amine to the reaction system, adding a catalyst II dropwise thereto, and performing coupling reaction while stirring; and 2) separating a by-product from a product obtained after the coupling reaction out, and purifying the product.

In some embodiments, the alcohol amine is one or a mixture of more than two selected from the group consisting of ethanolamine, ethylene glycol amine, diisopropanolamine, methyldiethanolamine, and triethanolamine.

In some embodiments, the small-molecule aldehyde is one or a mixture of two selected from the group consisting of formaldehyde, acetaldehyde, and propionaldehyde.

In some embodiments, the polyaldehyde is one or more selected from the group consisting of glyoxal, glutaraldehyde, and adipaldehyde.

Some embodiments of the present disclosure have the following beneficial effects:

1. In the present disclosure, the polycyclic azide desulfurizer has a high desulfurization effect, and an obvious polycyclic coupling structure. A special coupling group could achieve high-efficiency chain decomposition when interacting with S, thereby achieving high-efficiency sulfur removal capability higher than that of a traditional monocyclic structure.

2. In the present disclosure, the desulfurizer with a concentration of 200 mg/L to 1,000 mg/L could achieve a desulfurization rate of 95% to 99.8%, which greatly reduces a consumption of the desulfurizer and reduces a cost of sewage desulfurization in natural gas fields.

DETAILED DESCRIPTION OF THE EMBODIMENTS

The examples of the present disclosure will be described in detail below in conjunction with drawings.

Figure 1:
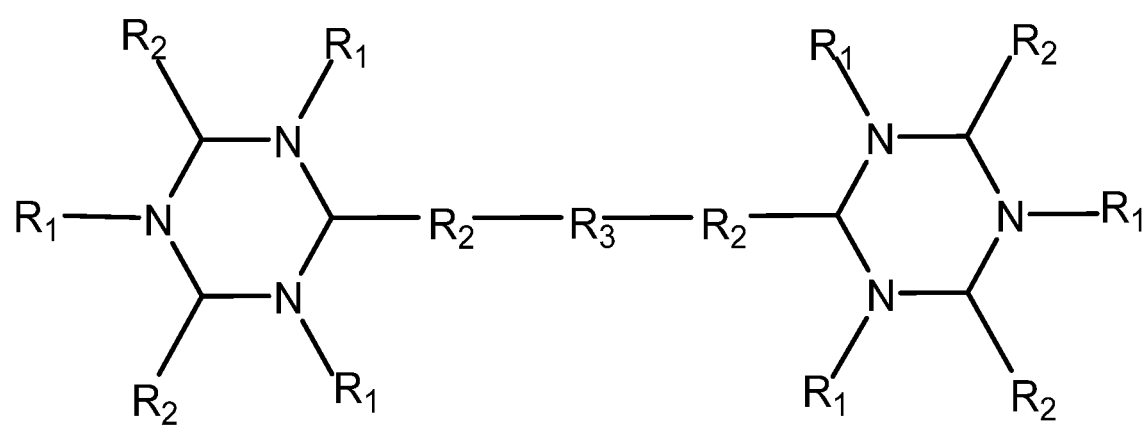
FIG. 1 shows a structural schematic diagram of the polycyclic azide desulfurizer according to some embodiments of the present disclosure.
Figure 2:
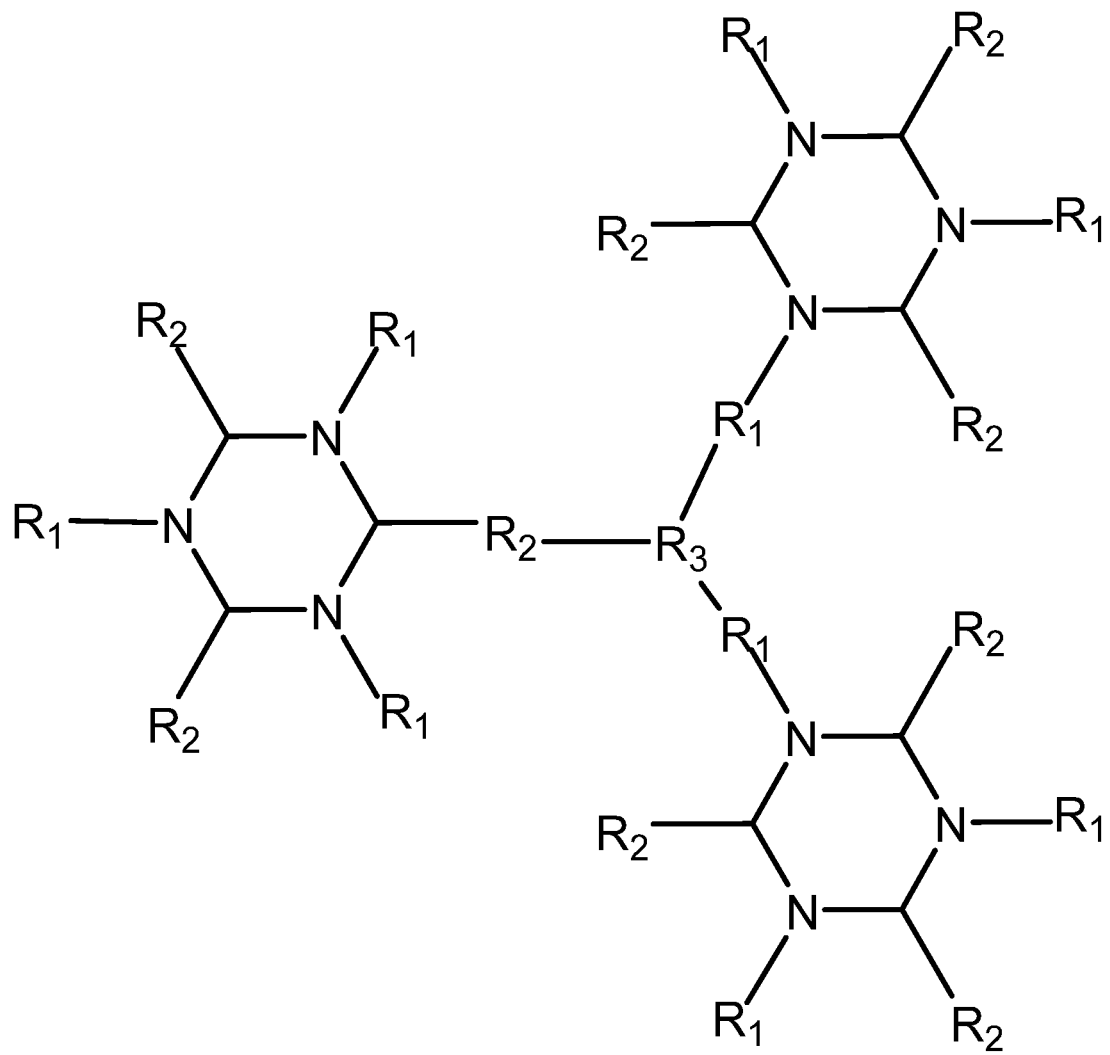
FIG. 2 shows another structural schematic diagram of the polycyclic azide desulfurizer according to some embodiments of the present disclosure.

In the present disclosure, the polycyclic azide desulfurizer has a structure shown in FIG. 1, and a method for synthesis of the polycyclic azide desulfurizer is described in the following examples.

Example 1

31 g of ethanolamine was added to a 500 mL three-neck flask and heated to 50° C., and 17 g of an amide was added thereto, and the resulting system was subjected to a reaction under the action of a catalyst 1 for 120 min to obtain a monocyclic triazine. The obtained monocyclic triazine was then added with 15 g of glyoxal, and then subjected to a reaction at 40° C. for 120 min under the action of a catalyst 2. The resulting reactant was subjected to separation and then purification to obtain a product.

Example 2

53 g of ethylene glycol amine was added to a 500 mL three-neck flask and heated to 60° C., and 17 g of an amide was added thereto, and the resulting system was subjected to a reaction under the action of a catalyst 1 for 180 min to obtain a monocyclic triazine. The obtained monocyclic triazine was then added with 15 g of glyoxal, and then subjected to a reaction at 40° C. for 120 min under the action of a catalyst 2. The resulting reactant was subjected to separation and then purification to obtain a product.

Example 3

75 g of triethanolamine was added to a 500 mL three-neck flask and heated to 70° C., and 17 g of an amide was added thereto, and the resulting system was subjected to a reaction under the action of a catalyst 1 for 240 min to obtain a monocyclic triazine; the obtained monocyclic triazine was then added with 15 g of glyoxal, and then subjected to a reaction at 55° C. for 120 min under the action of a catalyst 2. The resulting reactant was subjected to separation and then purification to obtain a product.

Example 4

31 g of ethanolamine was added to a 500 mL three-neck flask and heated to 50° C., and 17 g of an amide was added thereto, and the resulting system was subjected to a reaction under the action of a catalyst 1 for 120 min to obtain a monocyclic triazine; the obtained monocyclic triazine was then added with 25 g of glutaraldehyde, and then subjected to a reaction at 70° C. for 180 min under the action of a catalyst 2. The resulting reactant was subjected to separation and then purification to obtain a product.

Example 5

31 g of ethanolamine was added to a 500 mL three-neck flask and heated to 60° C., and 17 g of an amide was added thereto, and the resulting system was subjected to a reaction under the action of a catalyst 1 for 120 min to obtain a monocyclic triazine; the obtained monocyclic triazine was then added with 35 g of glutaraldehyde, and then subjected to a reaction at 70° C. for 210 min under the action of a catalyst 2. The resulting reactant was subjected to separation and then purification to obtain a product.

Example 6

31 g of ethanolamine was added to a 500 mL three-neck flask and heated to 60° C., and 34 g of an amide was added thereto, and the resulting system was subjected to a reaction under the action of a catalyst 1 for 120 min to obtain a monocyclic triazine; the obtained monocyclic triazine was then added with 25 g of glutaraldehyde, and then subjected to a reaction at 55° C. for 300 min under the action of a catalyst 2. The resulting reactant was subjected to separation and then purification to obtain a product.

Example 7

15 g of formaldehyde was added to a 500 mL three-neck flask and heated to 60° C., and 17 g of an amide was added thereto, and the resulting system was subjected to a reaction under the action of a catalyst 1 for 120 min, then 31 g of ethylene glycol amine was added, and then subjected to a reaction at 65° C. for 300 min under the action of a catalyst 2. The resulting reactant was subjected to separation and then purification to obtain a product.

Example 8

22 g of acetaldehyde was added to a 500 mL three-neck flask and heated to 70° C., and 17 g of an amide was added thereto, and the resulting system was subjected to a reaction under the action of a catalyst 1 for 120 min, then 31 g of ethanolamine was added, and then subjected to a reaction at 65° C. for 240 min under the action of a catalyst 2. The resulting reactant was subjected to separation and then purification to obtain a product.

Example 9

26 g of propionaldehyde was added to a 500 mL three-neck flask and heated to 60° C., and 34 g of an amide was added thereto, and the resulting system was subjected to a reaction under the action of a catalyst 1 for 180 min, then 75 g of triethanolamine was added, and then subjected to a reaction at 55° C. for 210 min under the action of a catalyst 2. The resulting reactant was subjected to separation and then purification to obtain a product.

Performance testing was separately conducted on the polycyclic azide desulfurizers in the above examples.

Test Example 1

Referring to the standard ASTM D4810-06, the performances were determined using the following experimental methods:

1. 8.4 g of $Na_2S \cdot H_2O$ white powder was weighed and dissolved in 20 mL of water to prepare into 1.8 mol/L $Na_2S$ aqueous solution.

2. 5.0 mL of 12 mol/L hydrochloric acid was measured and dissolved in water to prepare into 10 mL of dilute hydrochloric acid aqueous solution.

3. A desulfurizer to be investigated was diluted with water by a certain multiple to prepare into $H_2S$ desulfurizer with a concentration of 1,000 mg/L.

4. 20 mL of distilled water or methanol was added to an outer bottle of a reaction bottle, 1.0 mL of the dilute hydrochloric acid aqueous solution was added to an inner bottle of the reaction bottle, and a bottle mouth was covered with a rubber stopper. 1.0 mL of the $Na_2S$ aqueous solution was added into the inner bottle of the reaction bottle with a syringe, and the reaction bottle was shaken in a constant-temperature water bath oscillator at a certain temperature for 1 h.

5. 1.0 mL of the diluted desulfurizer was injected into the outer bottle of the reaction bottle with a syringe at a certain injection rate, and the reaction bottle was shaken for another certain period of time before stopping. A needle of a medical infusion set was connected to an inlet of an $H_2S$ rapid detection tube, and an end of the tube was connected to a hand pump matching the rapid detection tube to detect $H_2S$ concentration in the bottle. 50 mL of gas was extracted at a constant speed for 2 min, the $H_2S$ rapid detection tube gradually became darker at this time, and a reading at the critical point was recorded as A ppm. Another 50 mL of gas was extracted at a constant speed for 2 min, a total of 100 mL of gas was extracted at this time, and a reading at the critical point was recorded as $A_1$ ppm.

6. An excess amount of NaOH solution was injected into the reaction bottle to neutralize the residual $H_2S$.

7. The above experiments were repeated using $H_2S$ concentration in the reaction bottle without injecting the desulfurizer as a blank control, and the readings were recorded as B ppm and $B_1$ ppm, respectively.

A calculation formula of a desulfurization efficiency was as follows:

Desulfurization efficiency (%)=$(B-A)/B \times 100\%$

A comparison between the desulfurization efficiency of each of the above examples and that of other commonly used desulfurizers is shown in Table 1:

TABLE 1

| Agent name | $H_2S$ content (ppm) | Desulfurization efficiency (%) |
|---|---|---|
| Blank | 2000 | / |
| Example 1 | 14 | 99.3 |
| Example 2 | 28 | 98.6 |
| Example 3 | 22 | 98.9 |
| Example 4 | 20 | 99.0 |
| Example 5 | 16 | 99.2 |
| Example 6 | 26 | 98.7 |
| Example 7 | 24 | 98.8 |
| Example 8 | 16 | 99.2 |
| Example 9 | 32 | 98.4 |
| Monocyclic azide desulfurizer | 328 | 83.6 |
| Organic amine desulfurizer | 650 | 67.5 |

Test Example 2

For the sewage from 002-X1 well in a gas field in Sichuan, a reference standard of the added desulfurizer was GOST 33690-2015: Petroleum and petroleum products; the hydrogen sulfide content was determined by gas chromatography, as shown in Table 2:

TABLE 2

| Station name | $H_2S$ content of natural gas (g/m³) | Free $H_2S$ content in gas field water (mg/L) |
|---|---|---|
| X002-x1 well | 70.636 | 69.7 |

The desulfurizer was added at a molar ratio of desulfurizer to hydrogen sulfide in the sewage of 1.3:1, and stirred until the agent was evenly mixed in the sewage (about 10 s).

Specific parameters were as follows: gas chromatograph: sc-3000B; Chongqing Chuanyi Analytical Instrument Co., Ltd., China; stationary phase: 402 organic support, 80 mesh, Chongqing Chuanyi Analytical Instrument Co., Ltd., China; chromatography column: 3-meter stainless steel column, with an inner diameter 3 mm; detector: thermal conductivity detector; carrier gas: hydrogen; carrier gas flow: 40 mL/min; column temperature: 90° C.; detector temperature: 95° C.; bridge current: 300 mA; workstation: Zhejiang University N2000, China.

Regarding the gas field water at this station, the comparison between the desulfurization efficiency of each of the above examples and that of other commonly used desulfurizers is shown in Table 3:

TABLE 3

| Agent name | $H_2S$ content (mg/L) | Desulfurization efficiency (%) |
|---|---|---|
| Gas field sewage samples | 70.17 | / |
| Example 1 | 0.076 | 99.89 |
| Example 2 | 0.093 | 99.86 |
| Example 3 | 0.081 | 99.88 |
| Example 4 | 0.122 | 99.81 |
| Example 5 | 0.100 | 99.86 |
| Example 6 | 0.085 | 99.87 |
| Example 7 | 0.086 | 99.88 |
| Example 8 | 0.135 | 99.8 |
| Example 9 | 0.077 | 99.89 |
| Monocyclic azide desulfurizer | 14.23 | 80.20 |
| Organic amine desulfurizer | 22.31 | 68.89 |

As shown by the test data in the table, the polycyclic azide desulfurizer in the solution of the present disclosure has obvious actual sulfur removal efficiency compared to that of the monocyclic azide desulfurizer and organic amine desulfurizer. During use, the polycyclic azide desulfurizer of the present disclosure could be injected into the pipeline together with other agents.

In summary, compared with the prior art, the desulfurizer of the present disclosure has a simple formula, is miscible with water, could effectively reduce hydrogen sulfide in sewage, and generates water-soluble products. The desulfurizer causes changes in a molecular system after S enters the structure of desulfurizer, resulting in the increase of decomposed alcohol amines and thus essentially improving sulfur removal efficiency. The desulfurizer reduces production costs while increasing sulfur removal sites, and could effectively achieve qualitative leap in sulfur removal efficiency based on the original monocyclic azide compound.

The above embodiments are merely illustrative of embodiments of the present disclosure, and the description thereof is specific and detailed, but should not be construed as limiting the patent scope of the present disclosure. It should be noted that those skilled in the art could further make several variations and improvements without departing from the concept of the present disclosure, and all of these fall within the scope of the present disclosure.

What is claimed is:

1. A polycyclic azide desulfurizer, comprising the following raw materials in parts by mass: 20 parts to 35 parts of an alcohol amine, 20 parts to 35 parts of an amide, and an aldehyde, wherein the aldehyde is 10 parts to 15 parts of a small-molecule aldehyde or 20 parts to 35 parts of a polyaldehyde, wherein the alcohol amine is ethylene glycol amine, and wherein the azide desulfurizer is synthesized by a method comprising the following steps:

1) mixing the alcohol amine with the amide and stirring to obtain a mixture I, heating the mixture I, adding a catalyst I dropwise to the mixture I, and performing reaction to obtain a monocyclic triazine, then heating the monocyclic triazine, mixing with the polyaldehyde and stirring to obtain a mixture II, adding a catalyst II dropwise to the mixture II, and performing coupling reaction while stirring; alternatively, mixing the small-molecule aldehyde with the amide and stirring to obtain a mixture III, heating the mixture III, adding a catalyst I dropwise to the mixture III, and performing reaction to obtain a reaction system, adding the alcohol amine to the reaction system, adding a catalyst II dropwise thereto, and performing coupling reaction while stirring; and 2) separating a by-product from a product obtained after the coupling reaction out, and purifying the product.

2. The polycyclic azide desulfurizer of claim 1, wherein the small-molecule aldehyde is one or a mixture of two selected from the group consisting of formaldehyde, acetaldehyde, and propionaldehyde.

3. The polycyclic azide desulfurizer of claim 2, wherein the polyaldehyde is one or more selected from the group consisting of glyoxal, glutaraldehyde, and adipaldehyde.

4. A method for synthesis of a polycyclic azide desulfurizer, comprising the following steps:

1) mixing an alcohol amine with an amide and stirring to obtain a mixture I, heating the mixture I, adding a catalyst I dropwise to the mixture I, and performing reaction to obtain a monocyclic triazine, then heating the monocyclic triazine, mixing with a polyaldehyde and stirring to obtain a mixture II, adding a catalyst II dropwise to the mixture II, and performing coupling reaction while stirring; alternatively, mixing a small-molecule aldehyde with an amide and stirring to obtain a mixture III, heating the mixture III, adding a catalyst I dropwise to the mixture III, and performing reaction to obtain a reaction system, adding an alcohol amine to the reaction system, adding a catalyst II dropwise thereto, and performing coupling reaction while stirring; and 2) separating a by-product from a product obtained after the coupling reaction out, and purifying the product, wherein the alcohol amine is ethylene glycol amine.

5. The method of claim 4, wherein the small-molecule aldehyde is one or a mixture of two selected from the group consisting of formaldehyde, acetaldehyde, and propionaldehyde.

6. The method of claim 5, wherein the polyaldehyde is one or more selected from the group consisting of glyoxal, glutaraldehyde, and adipaldehyde.

* * * * *